United States Patent [19]

Lee

[11] Patent Number: 4,715,144
[45] Date of Patent: Dec. 29, 1987

[54] PLANT CONTAINER WITH CONCAVOCONVEX RIBS

[75] Inventor: Norman C. Lee, Greensboro, N.C.

[73] Assignee: Zarn, Inc., Reidsville, N.C.

[21] Appl. No.: 837,501

[22] Filed: Mar. 7, 1986

[51] Int. Cl.$^4$ ............................................. A01G 9/02
[52] U.S. Cl. ........................................ 47/66; 47/73
[58] Field of Search ................. 47/66, 71, 82, 83, 73; 206/519, 520; D11/152; D9/429

[56] References Cited

U.S. PATENT DOCUMENTS

| | | |
|---|---|---|
| Re. 29,320 | 7/1977 | Kalata et al. ............... 206/520 |
| D. 54,081 | 11/1919 | Graham . |
| D. 56,252 | 9/1920 | Huyler . |
| D. 167,009 | 6/1952 | Tersini . |
| D. 193,485 | 8/1962 | White . |
| D. 195,699 | 7/1963 | Bostrom ....................... D9/429 |
| D. 231,300 | 4/1974 | Wirkkala . |
| D. 241,764 | 10/1976 | Gottsegen . |
| D. 248,153 | 6/1978 | Yoshida et al. . |
| D. 256,682 | 9/1980 | Lee et al. . |
| D. 264,686 | 6/1982 | Davis ........................... D9/429 |
| D. 266,750 | 11/1982 | Kodet . |
| 1,391,353 | 9/1921 | Wells .............................. 47/71 |
| 1,896,229 | 2/1933 | Ellis . |
| 2,045,189 | 6/1936 | Judd . |
| 2,075,186 | 3/1937 | Ellis . |
| 2,859,557 | 11/1958 | Lattuca . |
| 2,907,491 | 10/1959 | Gunn . |
| 3,009,603 | 11/1961 | Stockdale . |
| 3,094,240 | 6/1963 | Wanderer ..................... 206/519 |
| 3,315,410 | 4/1967 | French .......................... 47/66 |
| 3,578,204 | 5/1971 | Bloch, et al. . |
| 3,683,549 | 8/1972 | Simmon . |
| 3,785,088 | 1/1974 | Guarriello ..................... 47/66 |
| 4,043,077 | 8/1977 | Stonehocker . |
| 4,173,097 | 11/1979 | Staby . |
| 4,234,091 | 11/1980 | Koch . |
| 4,341,040 | 7/1982 | Smith . |

Primary Examiner—Robert A. Hafer
Assistant Examiner—Bradley M. Lewis
Attorney, Agent, or Firm—Bell, Seltzer, Park & Gibson

[57] ABSTRACT

A plant container with concavoconvex ribs for growing plants and the like which is characterized by its ability to easily prevent the soil medium in the container from collapsing into a hole which has been mechanically drilled into the soil medium in order that a plant may be inserted into the medium, by its ability to be easily nested, by its ability to be efficiently and comfortably handled, and by its ability to be easily drained with maintenance of an optimum water level. The plant container is readily adaptable for use with a variety of plants and includes a frusto conical body made of molded plastic and has a rim portion at the top and a base portion at the bottom. The sidewalls of the container consist substantially of concavoconvex ribs that are concave on the inside sidewall and convex on the outside sidewall. Additionally, the bottom of the plant container contains one or more channels that extend radially across the bottom of the plant container.

7 Claims, 9 Drawing Figures

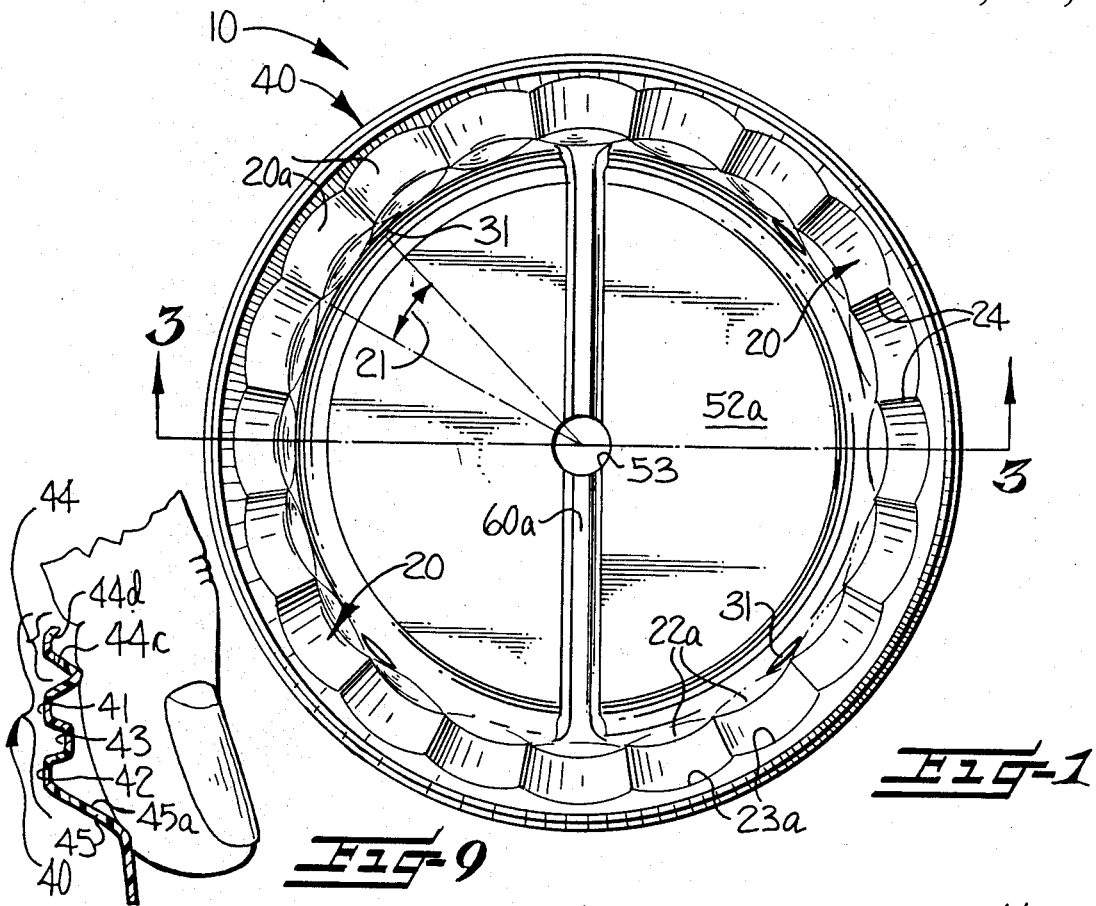
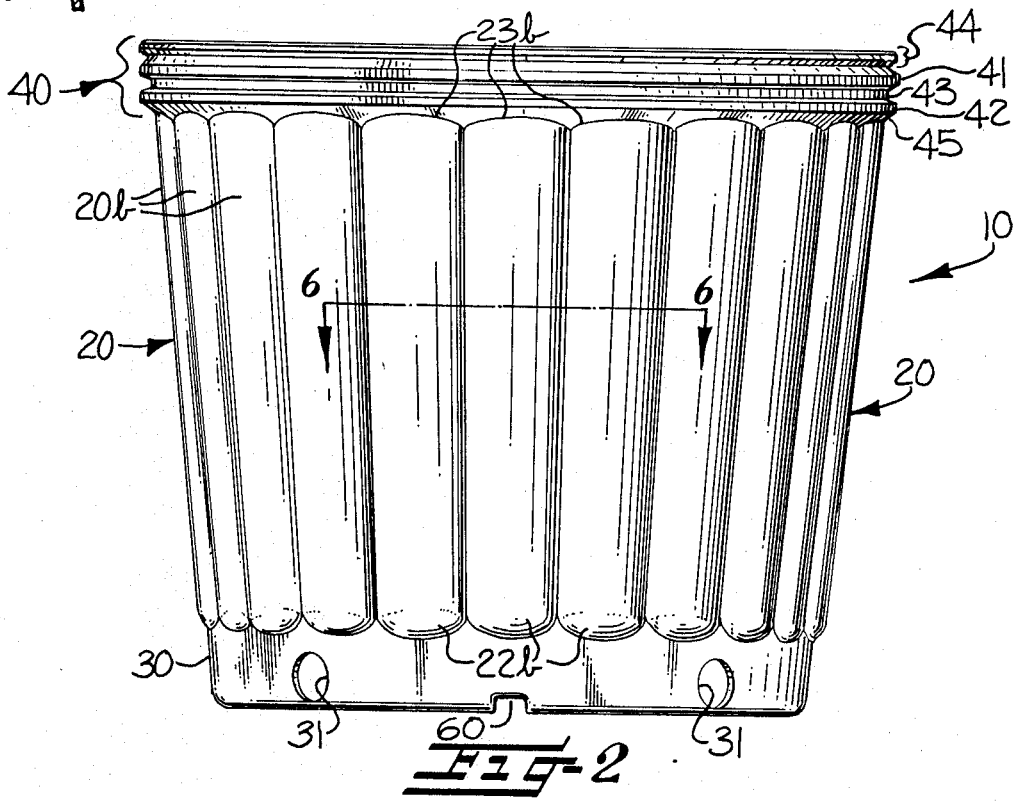

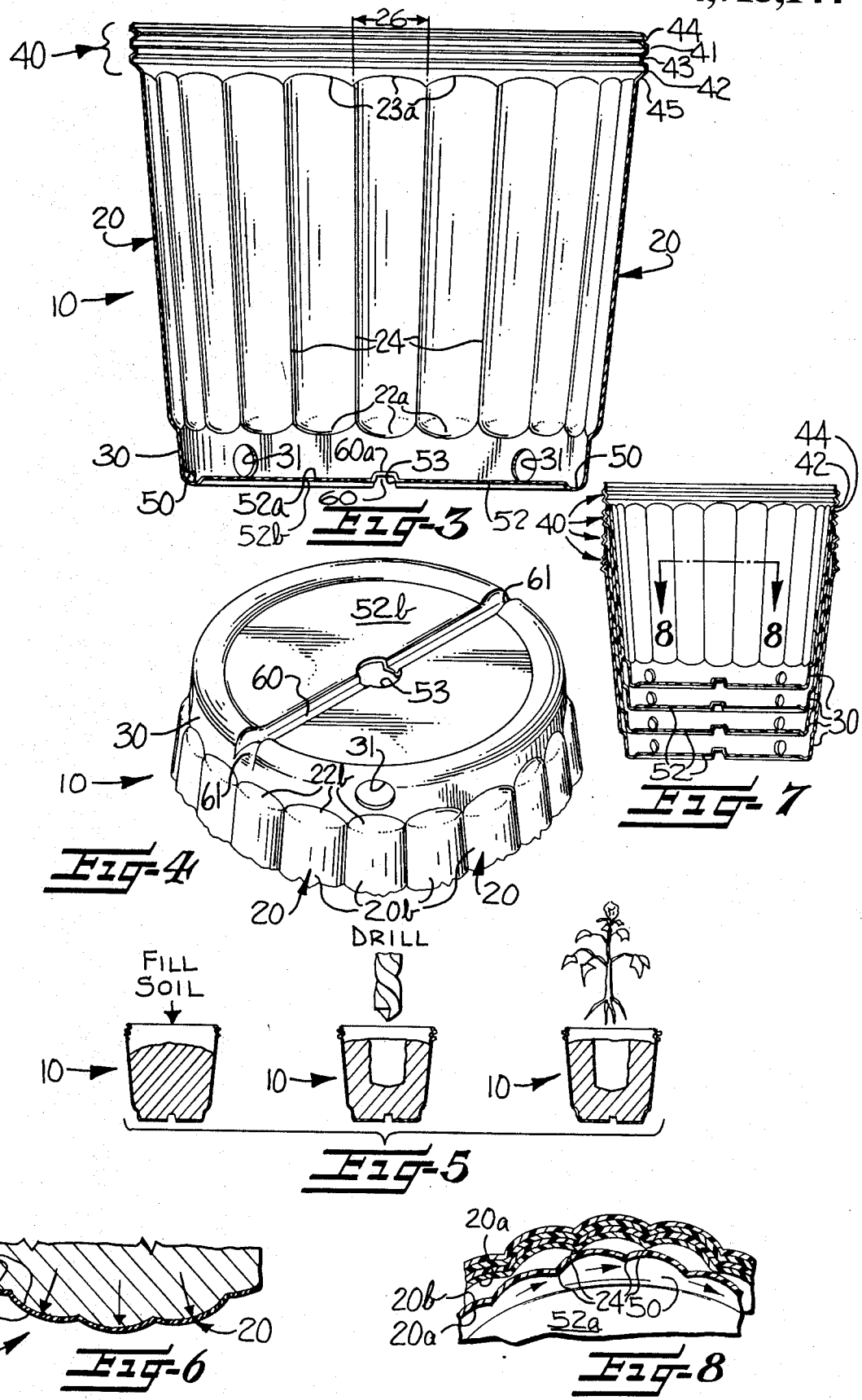

PLANT CONTAINER WITH CONCAVOCONVEX RIBS

BACKGROUND OF THE INVENTION

This invention relates to a plant container with concavoconvex ribs which is particularly effective for use in planting, growing and raising any type of plant that flourishes in a soil medium, and more particularly, an inexpensive plastic container which may be stacked in a nested relationship without sticking.

Recently there has been a tremendous increase in society's interest in growing plants, both on the commercial level and on the private individual level. This increase stems from the realization that a more natural environment and diet improves the quality and quantity of life and from societal trends that have made natural items more fashionable. As the use of potted plants for both utilitarian and aesthetic purposes increases, individuals and commercial entities interested in such endeavors search for plant containers that will allow them to more closely simulate natural growing conditions and to increase the performance and beauty of their plants. Thus, there is a need for new plant containers that will increase efficiency in producing plants and minimize the loss encountered when plants are replanted from an initial growing medium to an intermediate or permanent container.

One problem encountered, particularly in commercial plant growing and production, is the reduced efficiency in replanting operations occasioned by the collapsing of the surrounding soil medium into a hole that has been mechanically drilled in the soil medium to accept a plant before the roots of such plant can be placed in the hole. In replanting a plant into a new soil medium and Plant container, it is the usual practice in the commercial plant industry to use a soil drill to "drill" a hole in a soil medium previously placed in a plant container, and to place the roots of the plant into such hole. Inherent in this method, however, is the collapse of the surrounding soil medium into the "drilled" hole before the roots of the plant can be properly inserted. This results in a loss of efficiency in the replanting process and requires an expensive duplication of effort and a corresponding escalation in the overall operating costs of the commercial planter, which, undoubtedly, is eventually passed on to the consumer. Accordingly, an effective means for eliminating or minimizing the collapse of the soil medium into the "drilled" hole is needed.

Plant pots and the like as described, for example, in U.S. Pat. Nos. 256,682; 266,750; 2,859,557 and 3,009,603 do not attempt to remedy this problem. The orientation and construction of the ribbing on the side wall of the disclosed containers is such that it provides no additional support that would tend to keep the soil medium from collapsing. Furthermore, plant pots and the like as described, for example, in U.S. Pat. Nos. 167,009 and 1,896,229 exacerbate this problem in that the ribbing on the sidewall, because it is indented toward the center of the container, pushes the soil medium inward and reduces the support that the container provides the soil medium and increases the likelihood that the medium will collapse into the drilled hole.

A second problem encountered with plant containers in both commercial and private use, is the tendency of empty containers, when stored in a nested relationship, to become stuck inside one another. Suqh tendency reduces the efficiency with which workers at commercial nurseries can handle and use the plant containers and leads inevitably to the cracking, breaking and tearing of such containers when they are forcibly unstuck. This leads to reduced efficiency and increased costs. Additionally, such sticking creates a significant storage problem when it becomes necessary to store the containers separately rather than in a nested series.

Plant pots and the like as described, for example, in U.S. Pat. Nos. 167,009; 248,153; 2,859,557 and 3,683,549 get stuck inside one another when nested if they can be nested at all. The structure of those plant containers would necessarily require that a large portion of the inside sidewall of the one container come in simultaneous contact with a large portion of the outside sidewall of another container nested therein, thereby allowing the nested container to become wedged inside the other container. The plant pots described in, for example, U.S. Pat. Nos. 266,750 and 4,173,097, while capable of being nested without sticking, require a relative orientation between nesting containers before this desired result can be achieved. Such orientation necessarily requires those individuals involved in the use, sale and shipping of such plant containers to expend additional amounts of time in properly nesting the containers. While the plant container described in U.S. Pat. No. 4,234,091 may be nested without specific orientation, it must be disassembled from its usable form before it can be stacked or nested.

Furthermore, the plant containers described in U.S. Pat. Nos. 241,764 and 3,009,603, when nested, result in a top neavy stack. The stacks are necessarily top heavy because of the high center of gravity, caused by the relatively large vertical dimension between the uppermost circumferential point of one container and the uppermost circumferential point of a container nested therein. Said vertical dimension equates to the height of the relatively large rim at the top of the containers. In addition to creating a top-heavy stack, the configuration embodied in those patents greatly minimizes the number of pots that can be nested into a manageable stack, as the large vertical dimension of the rim results in a relatively tall stack when only several of the plant containers are nested. The large vertical dimension of the rim also creates a large amount of wasted space in the bottom of each container as the container nested therein does not fully insert into the container, and thus leaves a space between the outside bottom of the container nested therein and the inside bottom of the nesting container. Clearly, a plant container that will nest automatically without orientation and without sticking and that nests in such a way that a large number of such containers can be stacked into a manageable configuration is needed.

Another problem encumbent to plant containers is the collection of water in the bottom of a plant container due to overwatering. Overwatering generally creates a reservoir of wet or muddy soil in the bottom of the container that is unsuitable to effectively support plant life within the container, and may even be detrimental to the plant as it tends to drown the roots and kill the plant. Plant pots and the like as described, for example, in U.S. Pat. Nos. 2,859,557 and 3,009,603 provide a certain amount of drainage, but, if such containers are placed on a soft or uneven surface, the drainage holes easily become stopped and no drainage at all can occur. Furthermore, because some containers generally have small legs or protrusions arranged around the circumference of the bottom of the container to facilitate drainage, they have a relatively high center of gravity so that they topple over easily. Additionally, because said small legs or protrusions provide a relatively small area to support the weight of the container and its contents, they tend to puncture the thin plastic sheet that is used as a ground cover at many commercial nurseries or to sink into soft ground upon which they are placed. As such, the containers are ill suited for use except on hard, completely flat surfaces.

Another problem encountered with plant containers in both commercial and private use, is the comfort and ease, or lack thereof, with which an individual can handle the containers. This problem is most keenly felt in the private sector where horticulturalists tend to pursue their pastime without proper protection for the hands and arms. However, in the commercial sector, containers that are uncomfortable and difficult to use detract from the efficiency of the commercial operation and may even lead to an increase in work related injuries. The plant containers described in U.S. Pat. Nos. 54,081 and 3,683,549 provide nothing in the way of handles, lips or ribs that may be used to handle the container and maneuver it when it is filled with a soil medium and a plant. The individual handling the container is thus relegated to holding the container by its bottom, or trying to keep a sufficient handhold on the outside sidewall of the container to allow it to be moved. A plant container that overcomes these limitations is needed.

It is therefore, the object of the present invention to provide lightweight and inexpensive plant containers preferably made of formable plastic, which may be easily stored for convenient usage, more efficiently filled and planted, and which also provide improved plant containers for extended use during plant growth.

It is another object of the present invention to provide a container for plants that reduces the tendency of the soil medium in the container to fill a hole which has been drilled to accept the roots of a plant that is to be replanted into the container.

It is a further object of the invention to provide a container for plants and the like that will allow quick and efficient nesting without orientation and will nest in such a way as to result in a stack that contains a large number of pots and that is easy to handle.

It is also an object of the invention to provide a container for plants and the like which provides an effective means for allowing drainage from the plant container.

It is an additional object of the invention to provide a container for plants that is both comfortable and safe to use.

SUMMARY OF THE INVENTION

As described further hereinbelow, the present invention overcomes the limitations associated with prior known devices by providing a plant container that is generally frusto conical in shape made of molded plastic, for example by thermoforming, with concavoconvex ribs that will inhibit the soil medium in the plant container from collapsing into a hole drilled into the soil medium. The concavoconvex ribs have an additional advantage; in combination with the other structural elements of the container, they facilitate stacking with easy nesting without orientation for efficient handling.

In addition, the plant container provides a unique drainage system. Means are provided from which all parts of the soil medium may drain, thereby leaving no reservoirs of overwatered soil or mud in the container. In addition to drainage holes in the base portion, the bottom wall portion of the plant container contains one or more drainage holes that are intersected by a channel that extends across the bottom wall portion of the container and terminates at the outside of the base portion, thus ensuring efficient draining regardless of the surface upon which the plant container is placed.

Further, the plant container has a lower and upper rib and lip that make the plant container safe and more comfortable to use as well as providing additional structural integrity.

BRIEF DESCRIPTION OF THE DRAWINGS

Some of the objects having been stated, other objects will appear as the description proceeds, when taken in connection with the accompanying drawings in which FIG. 1 is a top plan view of the invention looking down into the container;

FIG. 2 is a side elevation of the improved plant container;

FIG. 3 is a sectional view along line 3—3 in FIG. 1;

FIG. 4 is a partial perspective of the bottom wall portion, base portion and sidewall portion of an upturned container;

FIG. 5 is a schematic showing the manner in which a plant container filled with soil is drilled for reception of a plant;

FIG. 6 is a fragmentary horizontal sectional view illustrating the new concavoconvex rib structure and the direction of compaction of soil when a container filled with soil is drilled for reception of a plant;

FIG. 7 is a side elevation of a series of plant containers in a nested relationship; and FIG. 8 is a sectional view along line 8—8 of FIG. 7 illustrating the automatic nesting of several plant containers; and FIG. 9 is a sectional view through the rim portion showing a thumb inserted into the plant container.

DETAILED DESCRIPTION OF THE PREFERRED EMBODIMENTS

As best seen in FIGS. 1 and 2, the novel plant container includes a unitary body 10 generally in the shape of a frusto conical, preferably formed of molded plastic of any thickness and color, but such body 10 may be formed of any type of material and made using any process that results in such a one-piece body. The body 10, and consequently the novel plant container, may be of varying dimensions both in height and top and bottom diameters.

As shown in FIGS. 1 through 4, the said novel plant container has sidewalls with concavoconvex ribs 20. Said ribs 20 are concave on the inside sidewall 20a of the body 10 and convex on the outside sidewall 20b of the body 10. The arc 21 that the said concavoconvex ribs sweep out can vary in different embodiments, as can the number of ribs 20 circumferentially arranged around the outside of the body 10.

Said concavoconvex ribs 20 that are concave on the inside and convex on the outside, provide additional support to the soil medium in the plant container. Said soil medium consists primarily of a mixture of peat, soil and fertilizer. As shown in FIGS. 5 and 6, when a hole is mechanically drilled in the soil medium in order to receive a plant, the soil medium undergoes compaction in a direction away from the drilled hole and such compaction causes the soil medium to crumble when the drill is removed with the result that the soil medium falls back into the hole after the drill is removed. In practice, it has been found that the concavoconvex ribs 20 act to retain the soil medium in its compacted configuration and thus reduce or prevent the soil medium from collapsing into the drilled hole. This phenomena has been observed to occur only when the sidewall of the plant container has concavoconvex ribs as herein disclosed. Containers with no ribbing or ribbing that is flat or concavoconvex with the concave areas on the outside and convex areas on the inside apparently allow the soil medium to crumble and fill the drilled hole. The arc 21 that the concavoconvex ribs 20 sweep out can be varied in different embodiments to optimize the soil configuration retention capabilities that the plant container provides for different size holes.

Said concavoconvex ribs 20 terminate near the bottom of the body 10 into scallop-shaped configurations 22b that join the base portion 30 that runs circumferentially around said body 10. The scallop-shaped configurations facilitate nesting without orientation as they readily fit into said concavoconvex ribs 20 at the inside sidewall 20a of the body 10 when the containers are stacked in a nested relationship. At their upper ends, said concavoconvex ribs 20 terminate near the lower rib 42 when they intersect the transition section 45 that extends inwardly and downwardly from the lower rib 42.

Additionally, said concavoconvex ribs 20 decrease in width as they near the bottom of the plant container. The width 26 of the concavoconvex ribs decreases as they grow closer to termination into scallop-shaped configurations 22b at the base portion 30 such that said concavoconvex ribs are more narrow at the bottom of the plant container than at the top. The amount of this decrease may be changed in different embodiments dependent upon the number of concavoconvex ribs 20 and their arc 21. This decrease in width facilitates the removal of the plant and soil medium in a single unit for replanting because it, in conjunction with the frusto conical shape of the plant container, which naturally makes the container wider at the top, removes any constrictions in the plant container that might otherwise inhibit such unitary removal. Additionally, the decrease in width, in conjunction with the scallop-shaped configurations of the concavoconvex ribs, facilitates automatic nesting without orientation as it allows two such plant containers to readily fit inside one another.

Several of the plant containers may be haphazardly thrown inside one another and still result in perfect nesting. As shown in FIG. 8, even if one plant container is forced inside another in such an orientation that the juncture 24 of a concavoconvex rib 20 comes in contact with a portion of the arc of another concavoconvex rib 20, the plant container being inserted into the other container will rotate about its vertical center axis until it reaches an orientation of perfect nesting. As such, not only does nesting of successive plant containers not require conscious orientation, but proper orientation is difficult to defeat. The decrease in width of the concavoconvex ribs 20 additionally prevents a nested series of plant containers from getting stuck together as such decrease in width, in conjunction with the frusto conical shape of the body 10 and the upper rib 41 and lower rib 42, prevents the concavoconvex ribs 20 of plant containers stacked in a nested relationship from nesting in contact with one another.

As shown in FIGS. 1, 2 and 3, and referred to above, the generally frusto conical body 10 terminates at its top into a rim portion 40. The rim portion 40 is comprised principally of an upper rib 41 and lower rib 42. The upper rib 41 and lower rib 42 extend circumferentially around the container and open toward the inside of the plant container. The upper rib 41 and lower rib 42 are separated by inverted rib 43 that opens toward the outside of the plant container. Said lower rib 42 meets the concavoconvex ribs 20 by way of transition section 45, which, as stated above, extends inwardly and downwardly from the lower rib 42. The combination of the upper rib 41 and lower rib 42 provides structural strength to the plant container and, more specifically, keeps it from losing its circular cross sectional integrity when filled with a soil medium or when it is handled during use. Furthermore, said upper rib 41 and lower rib 42 provide a resiliency that returns the plant container to its original configuration when its circular cross section becomes distorted during use or storage. At the same time, inverted rib 43 that separates the upper rib 41 and lower rib 42 makes the rim portion 40 particularly pliable in a direction of rotation about the sidewall of the body 10 and toward the center of the plant container or away from the center of the plant container. This rotation, in conjunction with the natural flexibility of the molded plastic material, allows the upper rib 41 and lower rib 42 to quickly and easily form a handle at any point or points around the circumference of the rim portion of the plant container when an individual grasps the container in such a way as to rotate the rim portion 40 about the sidewall of the body 10.

The transition section 45 provides several features to the utility of the plant container. It provides vertical reinforcement to the combination of upper rib 41, lower rib 42 and inverted rib 43 in that it minimizes the downward movement of such combination in response to application of a downward vertical force to the lip 44 of the plant container. Such a downward vertical force may occur when the plant container is handled or when it is dropped on the rim portion 40. The minimization of the downward movement ensures that the rim portion 40 of the plant container does not easily become torn or disfigured due to fatigue in the plastic that comprises the rim portion 40. As shown in FIG. 9, the transition section 45 additionally enhances the handling of the plant container as it provides a surface 45a on the inside of the plant container upon which an individual handling the container may place his thumb when he picks the plant container up by rim portion 40.

As shown in FIG. 7, when two or more of the plant containers are nested into a stack, the lower rib 42 of the container being nested comes immediately into contact with the lip 44 of the other container in such a way as to not allow the container being nested to be inserted into the other container further. The point at which this contact occurs further ensures that the sidewalls of successive plant containers do not stick to one another when stacked in a nested relationship or, indeed, even come in contact with each other. However, in the preferred embodiment, the total vertical dimension occupied by the rim portion 40, which is the vertical dimension by which the nested plant container does not totally insert into the nesting container, is the optimum vertical dimension to allow efficient nesting and to simultaneously allow many plant containers to be nested in a large series but still retain a "tight" stack in which all of the plant containers stay nested until separated. Furthermore, that same vertical dimension minimizes the amount of wasted space in the inside bottom of the nesting containers and thereby facilitates efficient stacking and minimizes the amount of space required for that stack.

The dimension of the inverted rib 43 may be altered in order to change the characteristics of the upper rib 41 and lower rib 42 and may be constructed in such a way that some type of frame or ring may be fitted into the inverted rib 43 to provide a means from which the container with plant and soil may either be suspended from above, as from the ceiling, or supported from below, as with some kind of framework.

Furthermore, as shown in FIG. 9, lip 44 protrudes outwardly and upwardly and inwardly from the upper rib 41 in the form of a smaller rib comprising an outwardly projecting section 44c and an inwardly projecting section 44d that extends inwardly toward the center of the plant container a lesser distance than inverted rib 43 or the groove between upper rib 41 and lip 44.

Said lip 44 extends circumferentially around the body 10 as does the groove that separates the upper rib 41 and lip 44. As illustrated in FIG. 9, such a construction substantially eliminates the danger of injury resulting from contact with the topmost edge of the container when an individual picks the container up with his thumbs in contact with the rim portion 40, as the individual's thumbs come in contact with the inside of the groove and transition section 45a and not with the topmost edge of the container. Additionally, as stated above, said lip 44 contributes to the overall effectiveness of the upper rib 41 and lower rib 42 in providing a second practical and comfortable means by which an individual may pick up the plant container by grasping the rim portion 40 in such a way as to rotate the rim portion about the sidewall and form a handle in the rim portion.

As stated above and shown in FIGS. 1 through 4, the concavoconvex ribs 20 terminate near the bottom of the body 10 into scallop-shaped configurations 22b that join the base portion 30 that runs circumferentially around said body 10. Said base portion 30 is not part of the frusto conical, but extends downwardly and inwardly from the sidewall of the plant container. Arranged at various points around the base 30 are four or more circular perforations that serve as drainage holes 31. Said drainage holes 31 may be of whatever diameter and number necessary to efficiently drain the plant container. Said drainage holes 31 are located at the lowest possible point of the plant container and intersect the rib 50 which extends circumferentially around the bottom wall portion 52 of the plant container. As such, the drainage holes 31 prevent a reservoir of water from forming in any part of the plant container and thereby eliminate the possibility of damage to the plant from overwatering. Said drainage holes 31 may consist of perforated "punch outs" that allow the drainage holes 31 to remain covered while in shipment, and then are punched out by the consumer when ready for use. Such an embodiment facilitates the use of the plant container to ship and store previously prepared soil or plants that have not germinated without leaking or to simply allow the consumer to choose the quantity of drainage holes 31 that best meets his needs.

Additionally, said drainage holes 31 provide an opening through which carbon dioxide and other gases in the surrounding atmosphere may permeate into the soil medium in the container and diffuse through said soil medium to the plant therein, particularly those parts of the plant, such as the roots, that normally receive little carbon dioxide, thereby facilitating its growth and health.

As shown in FIGS. 2 through 4, in the preferred embodiment, the base portion 30 in addition to being a termination point of the concavoconvex ribs 20, gives way at its lowest point to a rib 50 extending outwardly from the bottom wall portion 52b and open toward the inside of the container which extends circumferentially around the bottom wall portion 52 of the plant container, said rib 50 being concave on the inside bottom wall portion 52a of the plant container and convex on the outside bottom wall portion 52b of the plant container. The plant container rests on the rib 50. Said rib 50 provides additional structural strength to the bottom wall portion 52 of the plant container and thereby prevents the bottom wall portion 52 from losing its circular cross-sectional configuration and prevents it from sagging when the plant container is filled with a plant and soil medium and then picked up for relocation.

As shown in FIGS. 1 and 4, the bottom wall portion 52 contains one or more drainage holes 53. Said drainage holes 53 may be of number and size as is required to effectively drain the plant container. Additionally, as shown in FIGS. 2 through 4, the bottom wall portion 52 contains one or more drainage channels 60 that extend across the diameter of the bottom wall portion 52, intersect the drainage holes 53 in the bottom wall portion 52 and terminate at a point at 61 on the base portion 30. Such channels 60 open toward the outside of the plant container and project into the inside of the plant container. The channels 60 greatly facilitate the drainage of excess water from the bottom of the plant container as they offer a "path of least resistance" for the excess water from a point in the plant container, namely the bottom, that contains the largest amount of excess water. Said channels perform this drainage function regardless of the surface upon which the container is set or whether the bottom wall portion 52 is pressed, by the weight of the soil medium, onto and against the surface that supports the plant container.

Furthermore, as shown in FIGS. 1 and 3, the back portion of said channel 60 forms a rib 60a that extends across the inside bottom wall portion 52a of the plant container. Said rib 60a provides additional structural support for the bottom wall portion 52 of the container in that it prevents deformation from its generally circular cross section and provides a resiliency that restores the bottom wall portion 52 to its original configuration if any deformation should occur.

In the drawings and specification, there have been set forth preferred embodiments of the invention, and although specific terms are employed, they are used in a generic and descriptive sense only and not for purposes of unduly limiting the scope of the present invention, which scope is defined by the appended claims.

That which is claimed is:

1. A container for planting and growing plants in soil medium consisting of a unitary body forming a substantially frusto conical cylinder of thin, molded plastic material comprising:
   a sidewall portion comprising substantially vertically extending circumferentially arranged elongate concavoconvex ribs with the concave areas of said ribs facing inwardly toward the center axis of the plant container and the convex areas of said ribs facing outwardly away from the center axis of the plant container, said concavoconvex ribs decreasing in width as they extend from the top to the bottom of the container, a circumferentially extending rim portion comprising a circumferentially extending upper rib and lower rib, and a third intermediate rib, said upper and lower ribs both opening toward the inside of the plant container, and the intermediate rib opening toward the outside of the plant container, said rim portion also including a lip comprising an annular extension extending outwardly and upwardly and inwardly from said upper rib and forming a smooth uppermost edge, a circumferentially extending transition portion extending inwardly and downwardly from said lower rib and connecting the rim portion with the sidewall portion of said plant container, a circumferentially extending base portion contiguous with the lower end of said sidewall portion, said base portion having a plurality of drain openings, and a bottom wall portion integral with said base portion and comprising a substantially flat bottom wall for support of said plant container.

2. A container for growing plants according to claim 1 wherein said base portion comprises an unribbed circumferentially extending cylinder between the lower termination of said concavoconvex ribs and the bottom wall portion of said plant container.

3. A container for growing plants according to claim 1 wherein said bottom wall portion has a rib opening to the inside of the plant container and projecting downwardly from said bottom wall portion and extending circumferentially around the perimeter of the bottom wall portion, thereby forming a support for the container.

4. A container for growing plants according to claim 1 wherein adjacent concavoconvex ribs are contiguously arranged.

5. A container for growing plants according to claim 1 wherein said concavoconvex ribs terminate at said base portion into scallop shaped configurations.

6. A container for planting and growing plants in a soil medium consisting of a unitary body forming a substantially frusto conical cylinder of thin, molded plastic material comprising:

a sidewall portion comprising substantially vertically extending circumferentially arranged contiguous concavoconvex ribs, said concavoconvex ribs being arcuate with the concave areas of said ribs facing inwardly toward the center axis of the plant container and the convex areas of said ribs facing outwardly away from the center axis of the plant container to facilitate support of the soil medium contained therein during a hole drilling operation for planting, the juncture area of adjacent ribs being positioned closer to the center axis of said plant container than the remaining portions of the concavoconvex ribs, and said concavoconvex ribs decreasing in width as they extend from the top to the bottom of the container, a rim portion contiguous with the upper ends of said concavoconvex ribs comprising a circumferentially extending upper rib and lower rib opening toward the inside of a plant container connected by a third rib opening toward the outside of the plant container, and a lip comprising an annular extension extending outwardly and upwardly and inwardly from said upper rib and forming a smooth uppermost edge, a transition portion extending inwardly and downwardly from said lower rib and connecting the rim portion with the uppermost point of the sidewall portion of said plant container, a bottom wall portion comprising:

a substantially flat bottom wall having a supporting base rib portion opening to the inside of the plant container, projecting downwardly from said bottom wall portion, and extending circumferentially around the perimeter of the bottom wall portion, a channel extending across said bottom wall portion opening toward the outside of the plant container and projecting toward the inside of the plant container to form a channel-shaped drainage space between the bottom wall portion of said container and its supporting surface, and said bottom wall having at least one drain opening intersected by said channel, a circumferentially extending base portion connecting the lower termination of said concavoconvex ribs and the bottom wall portion, said base portion having a plurality of drain openings therein.

7. A container for planting and growing plants consisting of a unitary body forming a substantially frusto conical cylinder of thin, molded plastic material comprising:

a sidewall portion comprising substantially vertically extending circumferentially arranged elongate ribs, a circumferentially extending rim portion comprising a circumferentially extending upper rib and lower rib, both opening toward the inside of the plant container, connected by a third rib opening toward the outside of the plant container, and a lip comprising an annular extension extending outwardly and upwardly and inwardly from said upper rib and forming a smooth uppermost edge, a transition section extending inwardly and downwardly from said lower rib and connecting the rim portion to the upper end of the sidewall portion of said plant container, a circumferentially extending base portion contiguous with the lower end of said sidewall portion, the base portion having a plurality of drain openings, and a bottom wall portion integral with said base portion and comprising a substantially flat bottom wall for support of said plant container.

* * * * *